United States Patent [19]
Alliston et al.

[11] Patent Number: 5,391,211
[45] Date of Patent: Feb. 21, 1995

[54] INTEGRAL CYLINDRICAL CYCLONE AND LOOPSEAL

[75] Inventors: Michael G. Alliston, Lewisburg; Song Wu, S. Williamsport; Brian T. Sinn; Kevin Lato, both of Williamsport, all of Pa.

[73] Assignee: Tampella Power Corporation, Williamsport, Pa.

[21] Appl. No.: 187,197

[22] Filed: Jan. 24, 1994

[51] Int. Cl.[6] .............................................. B01D 45/12
[52] U.S. Cl. .................... 55/269; 55/459.1; 55/463; 110/216
[58] Field of Search .............. 55/269, 267, 392, 447, 55/449, 459.1, 463, 474; 110/216

[56] References Cited

U.S. PATENT DOCUMENTS

| | | | |
|---|---|---|---|
| 3,219,420 | 11/1965 | Dielenberg | 55/459.1 |
| 3,885,933 | 5/1975 | Putney | 55/459.1 |
| 4,746,337 | 5/1988 | Magol et al. | 55/269 |
| 4,944,250 | 7/1990 | Seshamani | 55/269 |
| 5,123,939 | 6/1992 | Morin et al. | 55/269 |
| 5,203,284 | 4/1993 | Dietz | 55/269 |

Primary Examiner—Charles S. Bushey
Attorney, Agent, or Firm—Notaro & Michalos

[57] ABSTRACT

A cyclone separator for a solids-laden process gas from a reactor also provides a pressure seal for the reactor. The cyclone includes a main housing with a longitudinal axis. The housing is made of a membrane wall construction having a plurality of tubes arranged around the axis and encased within membrane wall panels. A portion of the tubes are bent outwardly to form an inlet which communicates with the main housing for receiving the solids-laden process gas from the boiler. Solids are separated from the solids-laden process gas as they swirl together in the main housing of the cyclone separator. A partition wall is disposed at the lower section of the main housing around the longitudinal axis for defining an outer chamber and an inner chamber adjacent to the outer chamber. Gas is provided to the outer and inner chambers for creating fluidized beds of the solids in the outer and inner chambers. Solids are passed from the inner chamber to the outer chamber through an underflow port in the partition wall. Solids exit the main housing from an overflow port which communicates with the reactor.

19 Claims, 4 Drawing Sheets

INTEGRAL CYLINDRICAL CYCLONE AND LOOPSEAL

FIELD AND BACKGROUND OF THE INVENTION

The present invention relates, in general, to circulating fluidized bed devices and, in particular, to a new and useful cyclone arrangement for such a boiler or reactor, for separating solids from the process gas of the boiler or reactor and for providing a pressure seal for the boiler or reactor.

Circulating Fluidized Bed (CFB) systems consist of a main reactor vessel, containing particulate solids through which the main process gas is passed, a solids separation device for separating entrained particulates from the process gas, and a means of transferring the solids that are separated from the process gas back into the main reactor vessel. Current CFB systems generally employ a cyclone type solids separator which discharges solids into a pressure seal. The seal prevents the short-circuiting of the process gas from the main CFB reactor vessel backwards through the cyclone separator. The cyclone separators are generally formed of an upper section that is a cylindrical barrel and a lower section that is a cone, which discharges collected solids into a downleg. The cyclone may be fabricated from either steel or refractory and steel, or in the case of certain CFB boiler systems, the cyclone is sometimes fabricated of boiler or steam tube circuitry. The pressure seal varies from system to system, and various types that have been used include non-mechanical types such as L-valves and loopseals, i.e. essentially manometers containing fluidized solids.

In the cyclone collectors described above, the solids collected in the barrel are constricted radially inwardly by the cyclone cone section, while they are carried downwardly by gravity into the lower cone section. Depending upon the particular design and application, this constriction of the solids flow may result in re-entrainment of the collected solids by the exiting gas vortex. In some cases the constriction may be severe enough to hinder the flow of solids from the conical hopper, resulting in accumulations of solids in the cone of the cyclone. Such accumulation sometimes has the ultimate effect of limiting collectibility by the cyclone in terms of flow rate.

In the case of CFB boiler systems, there has been significant interest in constructing a cyclone using either boiler or steam circuitry. The fabrication of the large conical section is labor intensive and requires special geometric manipulations of the circuitry used.

The cyclone collectors described above generally include an outlet gas tube or vortex tube that prevents the premature exit of solids-laden process gas from the cyclone. Vortex tubes are generally separate parts that are secured to the roof of the cyclone by welding, bolting, supporting, or some combination thereof. In the case of high temperature process applications, such as CFB boilers, the vortex tube must be made of materials that are capable of supporting not only their own weight but also the pressure differential across the tube, and must do so at high temperatures.

Also, in the case of CFB boiler systems, efforts have been made to fabricate the pressure seal from boiler or steam circuitry. Although designs of this sort have been successfully accomplished, they have generally consisted of a pressure seal assembly that is a separate unit with respect to the cyclone assembly.

Presently, there is no known system for providing a combined solids cyclone separator and pressure seal for a boiler which utilizes the boiler or steam circuitry.

SUMMARY OF THE INVENTION

The present invention provides a combined cylindrical cyclone and pressure loopseal for a CFB boiler or reactor or other solids-processing device. The present invention is an arrangement which combines both the separation of solids from the process gas of the boiler and the pressure seal of the boiler in one combined arrangement.

This arrangement comprises a main housing, which is cylindrical, having a longitudinal axis. The main housing is made of a membrane wall having a plurality of tubes disposed therein and oriented along the longitudinal axis.

An inlet communicates with the main housing for receiving a solids-laden process gas from the reactor. A partition wall is disposed at one end, i.e., the lower end of the main housing around the longitudinal axis for defining an outer chamber and an inner chamber adjacent the outer chamber. The separated solids accumulate in both the outer and inner chambers. Gas is provided to both the inner and outer chambers through gas plenums and gas tuyeres in order to create fluidized beds in both the inner and outer chambers.

An underflow port is provided in the partition wall between the inner chamber and the outer chamber for passing solids from the fluidized bed of the inner chamber to the fluidized bed of the outer chamber. An overflow port is provided in the main housing wall of the outer chamber in order to pass solids from the fluidized bed of the outer chamber back into the reactor. Together, the inner fluidized bed and the outer fluidized bed provide the pressure seal for the reactor.

An inner cylinder is provided within the main housing adjacent to the inner chamber and extends along the length of the longitudinal axis in the main housing. The inner surface includes a floor which defines an enclosure within the inner cylinder. The inner cylinder also includes a plurality of spaced tubes arranged along the longitudinal axis which extend from the floor to the vortex finder of the main housing. A lower ring header communicates with tubes that form the gas plenums at the lower end of the main housing and an upper ring header is located at the top of the main housing. The lower ring header and upper ring header are the termination points for the tubes which form the main housing and the inner surface.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
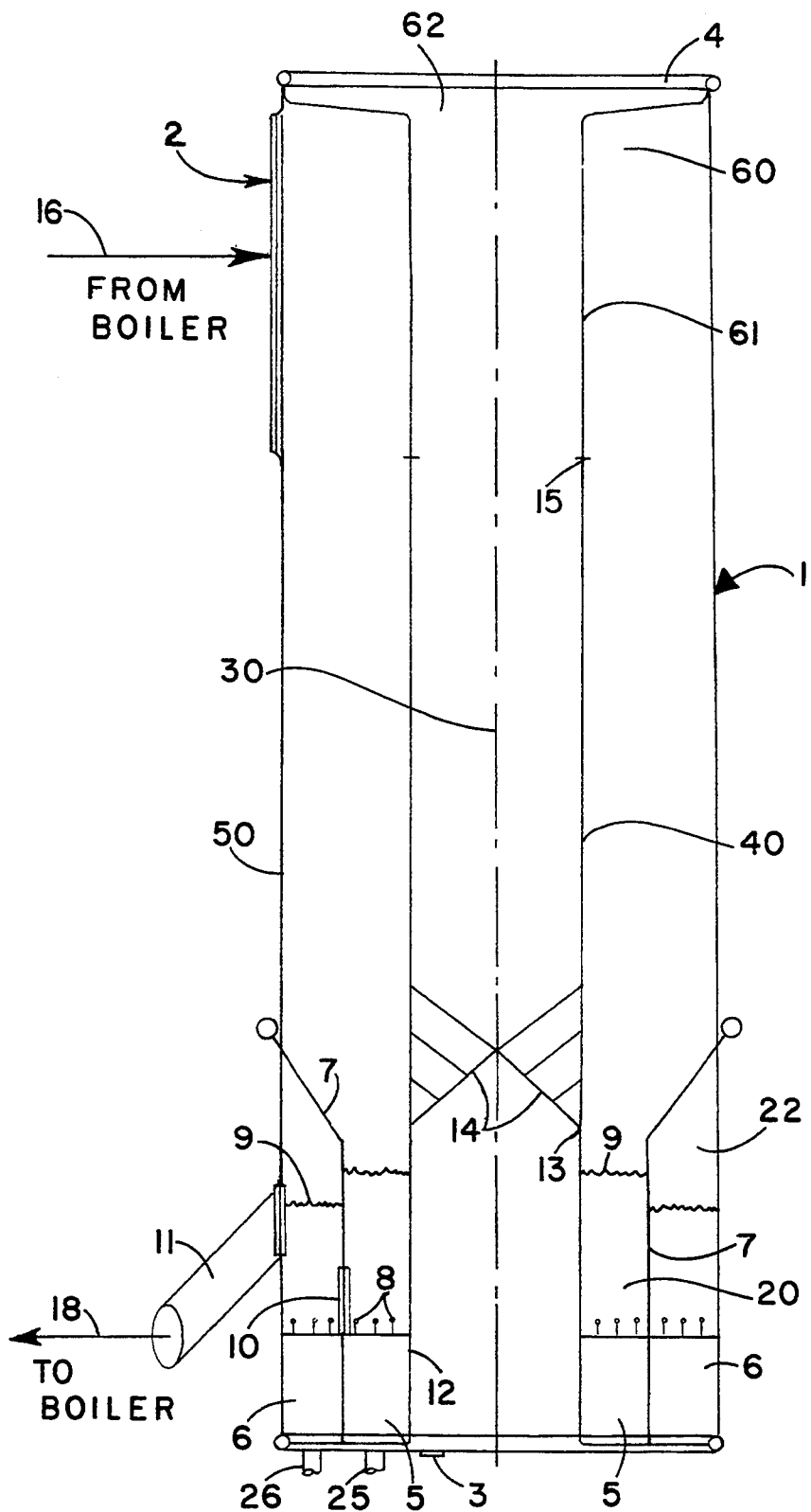
FIG. 1 is a schematic view illustrating a first embodiment of the present invention.
Figure 2:
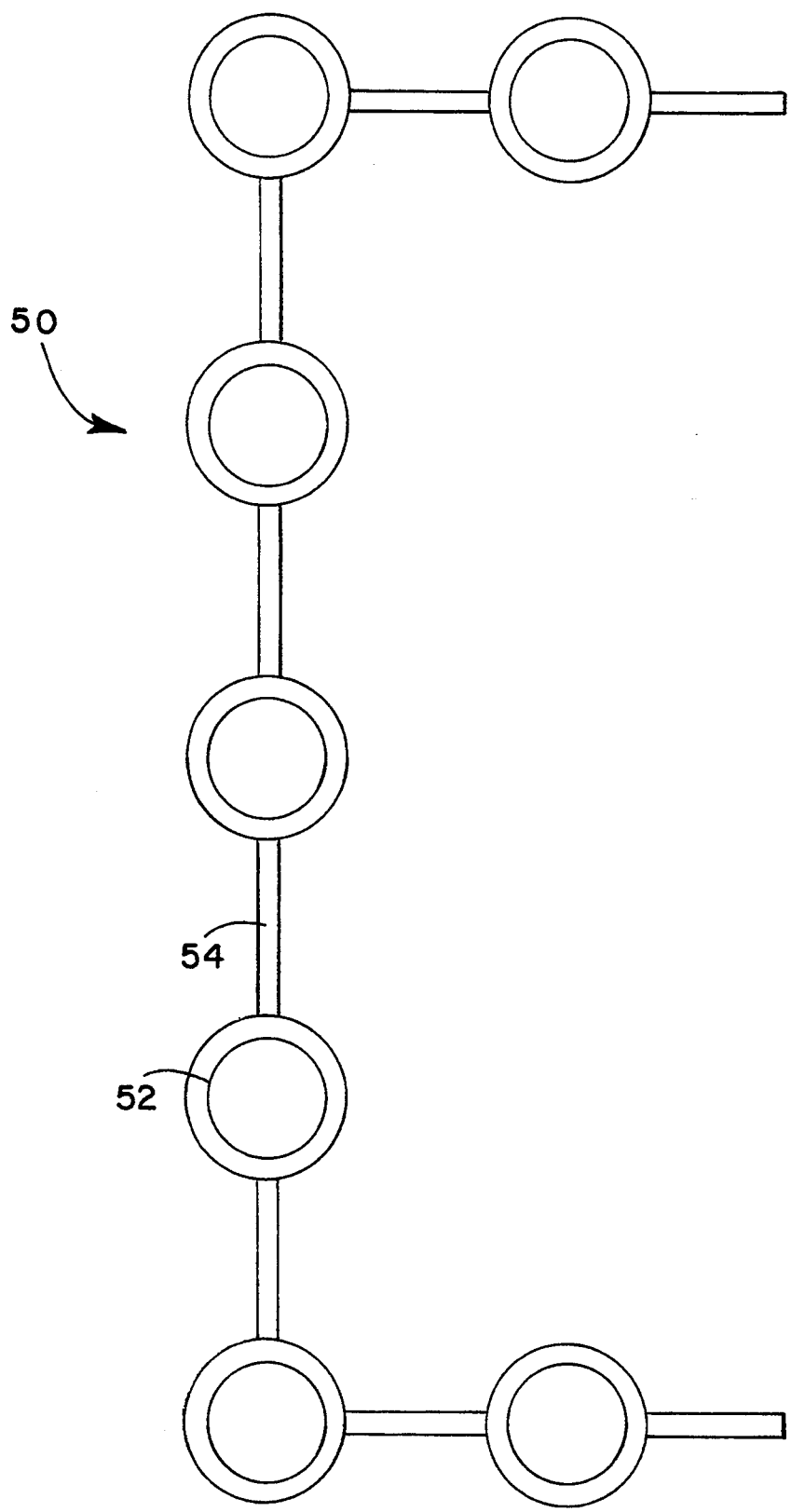
FIG. 2 is a schematic sectional view illustrating a typical membrane wall for use in the present invention.

The present invention facilitates the construction of a boiler or steam tube assembly and encompasses both a cyclone solid separator and a pressure seal. As shown in FIG. 1, the present invention comprises a main body or housing 1, which is cylindrical, comprising a membrane wall 50. FIG. 2 illustrates a typical membrane wall 50 in section, and having a plurality of tubes 52 separated by fins 54. The tubes 52 are arranged longitudinally in the walls of the main housing 1, around an axis 30 as shown in FIG. 1.

Near the top of cylinder 1, the tubes of the wall 50 are bent outwardly to form a solids-gas inlet 2 for receiving a solids-laden process gas from a fluidized bed device schematically shown at 16, such as a boiler. The tubes of wall 50 that form the outer main cylinder 1, begin at a lower ring header 3 which is a supply header of water or steam for the tubes 52. The tubes extend to an upper ring header 4 located at the top of cylinder 1 which performs as a collecting header. The lower ring header 3 also acts as a supply header for additional tubing which is bent to form gas plenums 5 and 6. The tubes that form plenums 5 and 6 continue to form a partition wall cylinder 7 above the air plenums 5 and 6 which act to separate the lower part of the main housing 1 into the two annular regions. Partition wall 7 forms an outer annulus or outer chamber 22 and an inner annulus or inner chamber 20.

The solids separated from the process gas accumulate in the outer chamber 22 and the inner chamber 20. By supplying gas through fluidizing tuyeres 8 above gas plenums 5 and 6, fluidized beds 9 are formed in both the inner chamber 20 and the outer chamber 22. Fluidizing gas inlets 25, 26 supply gas to plenums 5, 6.

Fluidized beds 9 in the annular regions 20 and 22 form a pressure seal. An underflow port 10 exists in partition wall 7 for permitting solids collected in the inner chamber 20 to pass to the outer chamber 22. An overflow port 11 is formed in the main housing 1 at the outer chamber 22 for permitting the solids to pass from the outer annular bed 22 and out of the main housing 1.

Figure 4:
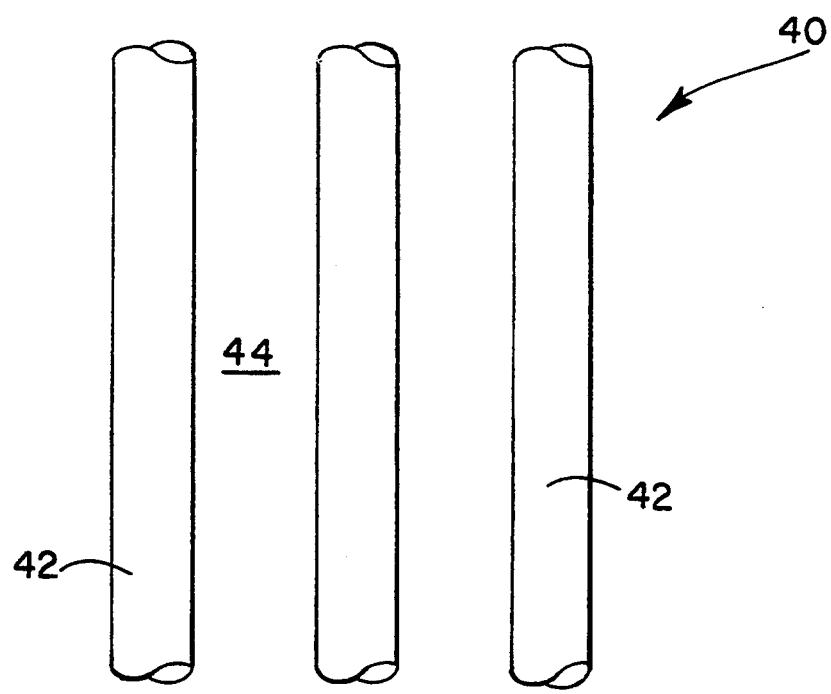
FIG. 4 is a perspective view illustrating a plurality of spaced tubes used in conjunction with the embodiment of FIG. 1.

Additional tubes from the plenum assembly 5 and 6 are arranged to form an inner cylinder 12 adjacent to the inner annulus 20. The inner cylinder 12 also comprises membrane wall like walls 50. At a bend point 13, tubes of wall 12 are separated to form a conical floor 14. The floor 14 and the membrane wall of the inner cylinder 12 form an enclosure adjacent inner annulus 20 about the axis 30 of the main housing 1. Once the conical central floor 14 is formed, the tubes of wall 12 are redirected back outwardly to remerge with an inner cylindrical arrangement 40. From this point upwardly, the inner cylinder is not formed of membrane wall construction, but instead has spaces between adjacent tubes to allow the passage of solids and gas. Inner cylindrical arrangement 40 comprising tubes 42 separated by spaces 44 as shown in FIG. 4, run parallel to axis 30 and extend from the floor 14 to area 15 of the inner cylinder 12. As shown in FIG. 4, the spacing 44 permits the passage of gas through the cylinder 12 to the inside of the inner cylinder 12.

At area 15, the tubes 42 of the inner cylinder 12, are again incorporated into membrane wall construction for forming a vortex finder 61. A vortex space 60 is formed between the vortex finder 61 and the main housing 1. The tube wall continues from the vortex finder 61 outwardly to form the roof of the main housing 1 and to the upper ring header 4. The height 15 at which the spaced separate tubes are reconnected by fins 54, form vortex finder 61.

In operation, thus particle ladened gas from the reactor enters the integral cyclone and loopseal housing 1 at inlet 2 and swirls in vortex space 60 as it falls through the annular space between the outer tube wall 50 and the inner cylinder 40.

Figure 3:
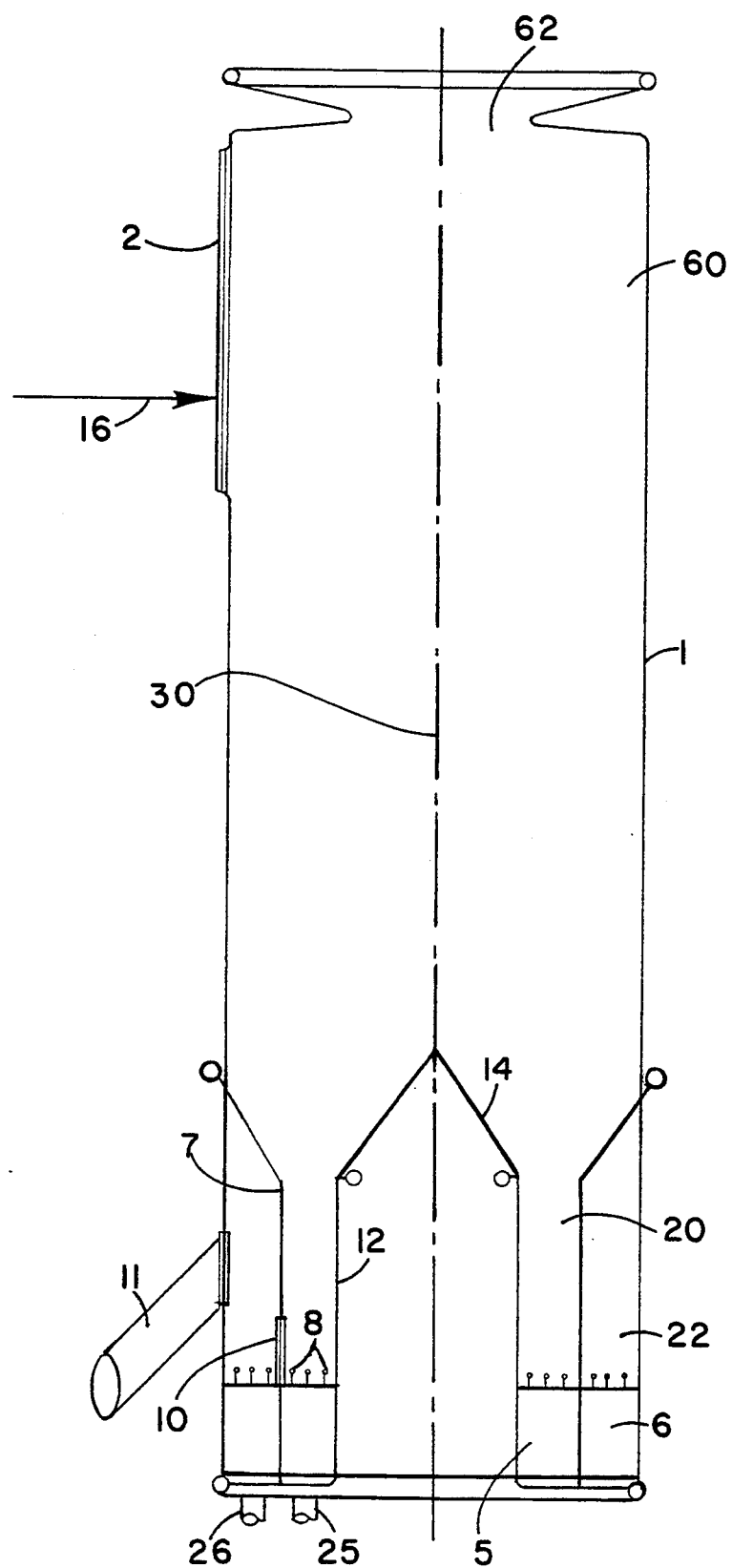
FIG. 3 is a schematic view illustrating a second embodiment of the present invention.

FIG. 3 illustrates a second embodiment according to the present invention, without an inner cylinder. The same reference numerals are used to designate the same or functionally similar parts in FIG. 3. Although the embodiment of FIG. 3 does not include an inner cylinder, it does include the conical floor 14 which diverts downwardly falling particles into the inner annular chamber 20 from where the particles can move through the underflow 10 at the bottom of partition wall 7 into the outer annular chamber 22 and thereafter through overflow outlet port 11 back to the reactor.

In both of the embodiments of FIGS. 1 and 3, gases exit through the top central area 62 of the housing 1.

The present invention has several advantages over the prior art.

Because the solids from the solids-laden process gas are not constricted in a cone at the bottom of a cyclone, as in conventional cyclones, the potential loss in collection efficiency due to cone-hopper flooding is minimized or eliminated. Further, the solids are intentionally directed outwardly from the natural gas flow path which is normally inwards around axis 30.

Because the present invention utilizes boiler or steam tubing for the cyclone-loopseal assembly, the construction of the present invention is made easier by the elimination of a main cyclone cone. Also, because of this, the tube spacing of the main cylinder 1 is selected on the basis of thermal considerations and not on the basis of a need to form a cone from a cylinder. Thus, a further advantage is that the internal refractories that are required for the purpose of achieving heat flux reduction are minimized. This, in turn, allows for thinner erosion resistant refractories to be used so that the entire assembly is used more effectively for heat transfer.

The present invention eliminates the need to have a separate cyclone and a separate loopseal assembly. The present invention also eliminates the need for expensive materials which normally form the cyclones vortex tube.

Because the entire assembly, according to the present invention, is comprised of heat exchanger surface, the amount of heat exchanger surface needed in the main CFB reactor vessel is minimized. Further, the heat transfer rates of the fluidized regions of fine particles in the annular chambers 20 and 22 are considerably higher than those in the combustor section of a typical CFB boiler.

For boiler tube assemblies, the present invention is integrated into the main CFB reactor circuitry so that expansion joints are eliminated. Superheat-tube assemblies are used in cases where there are CFB boilers with high superheat or reheat requirements. This eliminates the need for superheat surface in the main CFB reactor vessel or the need for an additional external heat exchanger.

The present invention also allows for further heat exchange surfaces to be added or retrofitted if desired. The main housing 1 of the present invention can be constructed to any length desired. As such, the vessel 1 is an excellent reaction chamber for various desirable reactions. The increased residence time of the present invention improves CO burnout. Further, sufficient gas residence time is allowed for additional chemical processing such as Selective Non-Catalytic Reduction (SNCR) type $NO_X$ mitigation processes.

While specific embodiments of the invention have been shown and described in detail to illustrate the application of the principles of the invention, it will be understood that the invention may be embodied otherwise without departing from such principles.

What is claimed is:

1. An arrangement for separating solids from a process gas produced in a solids-processing device and for providing a pressure seal for the device, the arrangement comprising:
   a main housing having a longitudinal axis;
   an inlet communicating with the main housing for receiving a solids-laden process gas and separating the solids from the gas;
   a partition wall in the main housing for separating an outer chamber from an inner chamber within the main housing;
   means for diverting solids falling in the main housing, into the inner chamber;
   first means for passing solids between the inner and outer chambers;
   means for providing fluidizing air to the outer and the inner chambers for creating fluidized beds of solids in the outer and the inner chambers; and
   second means for passing solids from the outer chamber out of the main housing and back to the solids-processing device.

2. The arrangement according to claim 1, including an inner cylinder adjacent and bounding the inner chamber around the longitudinal axis and extending along a length of the longitudinal axis within the main housing.

3. The arrangement according to claim 2, wherein the inner cylinder includes a floor forming part of said means for diverting solids into the inner chamber.

4. The arrangement according to claim 3, wherein the floor is conical.

5. The arrangement according to claim 1, wherein the second means for passing solids comprises an outlet communicating with the outer chamber of the main housing at a lower end of the main housing.

6. The arrangement according to claim 5, wherein the first means for passing solids comprises an underflow port in the partition wall between the inner and outer chambers for allowing solids to pass from the inner chamber to the outer chamber.

7. The arrangement according to claim 3, wherein the main housing comprises a membrane wall having a plurality of tubes disposed therein, the tubes being oriented along the longitudinal axis.

8. The arrangement according to claim 7, wherein the inner cylinder comprises a membrane wall having a plurality of tubes disposed therein, the tubes being oriented along the longitudinal axis.

9. The arrangement according to claim 8, including a header communicating with the tubes of the membrane wall of the main housing at each end of the main housing.

10. The arrangement according to claim 9, including a vortex finder formed by tubes from the inner cylinder at the top of the main housing.

11. The arrangement according to claim 10, wherein the main housing and the vortex finder comprise a vortex space at an upper end thereof adjacent to the inlet.

12. The arrangement according to claim 11, wherein the inner cylinder extends above the floor.

13. The arrangement according to claim 12, wherein the means for providing fluidizing air comprises a plenum below each of the inner and outer chambers at a lower end of the main housing.

14. The arrangement according to claim 13, wherein the means for providing fluidizing air further comprises tuyeres communicating between the chambers and the plenums.

15. The arrangement according to claim 14, wherein the main housing is cylindrical.

16. The arrangement according to claim 15, wherein the outer chamber and the inner chamber are annular.

17. An arrangement according to claim 1, wherein the main housing comprises an outer tube wall, an inner tube wall positioned within the outer tube wall and inwardly of the inner chamber, the inner wall including a roof forming a part of said means for diverting solids falling in the main housing into the inner chamber, an underflow passage in the partition wall between the inner and outer chambers forming the first means for passing solids, the partition including an upper portion extending to the outer wall and covering an upper end of the outer chamber.

18. An arrangement according to claim 17, wherein the inner wall extends above the floor, the inner wall comprising spaced tubes for the passage of gas across the inner wall up to the level of the vortex finder, the inner wall extending at the level of the vortex finder bottom in a tube wall with closed spaces between the tubes for forming the vortex finder, which together with the outer wall forms the vortex space communicating with the inlet.

19. An arrangement according to claim 18, including a gas outlet from the main housing above the inner wall.

* * * * *